United States Patent
Tzur et al.

(10) Patent No.: US 8,644,697 B1
(45) Date of Patent: Feb. 4, 2014

(54) METHOD FOR PROGRESSIVELY DETERMINING DEPTH FROM DEFOCUSED IMAGES

(75) Inventors: Meir Tzur, Haifa (IL); Guy Rapaport, Haifa (IL)

(73) Assignee: CSR Technology Inc., San Jose, CA (US)

(*) Notice: Subject to any disclaimer, the term of this patent is extended or adjusted under 35 U.S.C. 154(b) by 115 days.

(21) Appl. No.: 13/183,363

(22) Filed: Jul. 14, 2011

Related U.S. Application Data

(60) Provisional application No. 61/373,405, filed on Aug. 13, 2010, provisional application No. 61/379,843, filed on Sep. 3, 2010.

(51) Int. Cl.
 *G03B 3/00* (2006.01)
 *G03B 13/00* (2006.01)
(52) U.S. Cl.
 USPC .............................. 396/89; 396/125; 348/345
(58) Field of Classification Search
 USPC ....................... 396/89, 125; 348/345; 359/698
 See application file for complete search history.

(56) References Cited

U.S. PATENT DOCUMENTS

| | | | |
|---|---|---|---|
| 4,804,831 A | 2/1989 | Baba et al. | |
| 4,933,700 A | 6/1990 | Ikeda et al. | |
| 5,005,956 A | 4/1991 | Kaneda et al. | |
| 5,070,353 A | 12/1991 | Komiya et al. | |
| 5,144,357 A | 9/1992 | Ishida et al. | |
| 5,148,209 A | 9/1992 | Subbarao | |
| 5,151,609 A | 9/1992 | Nakagawa et al. | |
| 5,193,124 A | 3/1993 | Subbarao | |
| 5,231,443 A | 7/1993 | Subbarao | |
| 5,369,461 A | 11/1994 | Hirasawa et al. | |
| 5,475,429 A | 12/1995 | Kodama | |
| 5,793,900 A | 8/1998 | Nourbakhsh et al. | |
| 6,269,197 B1 | 7/2001 | Wallack | |
| 7,389,042 B2 | 6/2008 | Lin et al. | |

(Continued)

FOREIGN PATENT DOCUMENTS

| | | | |
|---|---|---|---|
| JP | 62284314 A | 12/1987 | |
| JP | 63127217 A | 5/1988 | |

OTHER PUBLICATIONS

Sewlochan, Ray, "Iterative Depth From Defocus (I-DFD) Algorithms." The University of British Columbia, Apr. 1995, <https://circle.ubc.ca/bitstream/2429/3716/1/ubc_1995-0270.pdf> Last accessed Oct. 28, 2009.

(Continued)

*Primary Examiner* — Christopher Mahoney
(74) *Attorney, Agent, or Firm* — Frommer Lawrence & Haug LLP; John W. Branch

(57) ABSTRACT

A system, method, and computer program product are provided for automatically progressively determining focus depth estimates for an imaging device from defocused images. After a depth-from-defocus (DFD) system generates sometimes-noisy estimates for focus depth and optionally a confidence level that the focus depth estimate is correct, embodiments of the present invention process a sequence of such input DFD measures to iteratively decrease the likelihood of focus depth ambiguity and to increase an overall focus depth estimate confidence level. Automatic focus systems for imaging devices may use the outputs of the embodiments to operate more quickly and accurately, either directly or in combination with other focus depth estimation methods, such as calculated sharpness measures. A depth map of a 3D scene may be estimated for creating a pair of images based on a single image.

28 Claims, 2 Drawing Sheets

(56) References Cited

U.S. PATENT DOCUMENTS

| | | |
|---|---|---|
| 2003/0063815 A1 | 4/2003 | Watanabe |
| 2005/0218231 A1 | 10/2005 | Massieu |
| 2006/0181644 A1 | 8/2006 | De Haan |
| 2008/0075444 A1 | 3/2008 | Subbarao et al. |
| 2008/0095312 A1 | 4/2008 | Rodenburg et al. |
| 2008/0211959 A1 | 9/2008 | Balram et al. |
| 2008/0297648 A1 | 12/2008 | Furuki et al. |
| 2010/0053417 A1* | 3/2010 | Baxansky .............. 348/345 |
| 2011/0181770 A1 | 7/2011 | Rapaport et al. |

OTHER PUBLICATIONS

Ziou, D., et al. "Depth from defocus estimation in spatial doman." Computer Vision and Image Understanding, vol. 81, No. 2, p. 143-165, Feb. 2001.

Asada, N., et al. "Depth from blur by zooming." Proc. Vision Interface, p. 165-172, 2001.

Pentland, A. "A New Sense for Depth of Field." IJCAI, p. 988-994, 1985.

Gokstorp, M. "Computing depth from out-of-focus blur using a local frequency representation." Proceedings of International Conference on Pattern Recognition, vol. 1, p. 153-158, 1994.

Watanabe, M., et al. "Real-time computation of depth from defocus." Proceedings of SPIE: Three-Dimensional and Unconventional Imaging for Industrial Inspection and Metrology, 2599, A-03, Nov. 1995.

Watanabe, M., et al. "Rational filters for passive depth from defocus." International Journal of Computer Vision, vol. 27, issue 3, May 1998.

Subbarao, M., et al. "Depth from defocus and rapid autofocusing: a practical approach." In Proc. CVPR, p. 73-776, 1992.

Subbarao, M., et al. "Depth from defocus: a spatial domain approach." International Journal of Computer Vision, vol. 13, No. 3, p. 271-294, Dec. 1994.

Xiong, Y., et al. "Depth from Focusing and Defocusing." Carnegie Mellon University, 28 pages, Mar. 1993.

Subbarao, M. "Parallel Depth Recovery by Changing Camera Prameters." Second International Conference on Computer Vision, Dec. 1988, p. 149-155.

Nayar, S.K., et al. "Real-time focus range sensor." IEEE Transactions on Pattern Analysis and Machine Intelligence, vol. 18, No. 12, Dec. 1996.

Bove, Jr., V.M. "Entropy-Based Depth from Focus." Journal of the Optical Society of America, A, 10, p. 561-566, Apr. 1993.

International Search Report and Written Opinion for International Patent Application No. PCT/US2009/056002 mailed Nov. 17, 2009.

International Search Report and Written Opinion for International Patent Application No. PCT/US2010/045927 mailed Oct. 8, 2010.

International Preliminary Report on Patentability for International Patent Application No. PCT/US2010/045927 mailed Aug. 9, 2012.

Official Communication for U.S. Appl. No. 12/409,416 mailed Jan. 11, 2012.

Official Communication for U.S. Appl. No. 12/409,416 mailed May 2, 2012.

Official Communication for U.S. Appl. No. 12/857,343 mailed Nov. 6, 2012.

Official Communication for U.S. Appl. No. 12/857,343 mailed May 24, 2013.

* cited by examiner

METHOD FOR PROGRESSIVELY DETERMINING DEPTH FROM DEFOCUSED IMAGES

CROSS-REFERENCE TO RELATED APPLICATIONS

This application claims priority under 35 U.S.C. 119(e) from U.S. Provisional Application Ser. No. 61/373,405 entitled "A Method For Progressively Determining Depth From Defocused Images" filed on Aug. 13, 2010, and U.S. Provisional Application Ser. No. 61/379,843 entitled "Progressive Depth From Defocus Scheme" filed on Sep. 3, 2010. This application is also related by subject matter to U.S. Ser. No. 12/409,416 entitled "Apparatus, Method, And Manufacture For Iterative Auto-Focus Using Depth-From-Defocus" filed on Mar. 23, 2009 and published on Mar. 4, 2010 as U.S. Patent Application Publication 2010/0053417A1, and to U.S. Ser. No. 12/857,343 entitled "Depth From Defocus Calibration" filed on Aug. 16, 2010. All applications cited above are expressly incorporated by reference in their entirety.

BACKGROUND OF THE INVENTION

1. Field of the Invention

This application relates in general to methods for focusing an imaging device and in particular to progressively estimating focus depth for a scene based on depth from defocus.

2. Discussion of Related Art

Many imaging devices employ automatic focus to allow for automatic adjustment of an imaging device to capture image data. For example, one conventional type of automatic focus is based on depth from focus (DFF). Conventional methods of DFF typically capture image data for each focal position of a scene. The sharpness of each focal position may be then analyzed to determine the sharpest focal position, that is the focal position with the highest sharpness metric. As a result of the sharpness determination, the imaging device may automatically set the focus. This approach, however, requires capturing a plurality of images and results in a period of delay during automatic focus. In many instances, the processing delays of DFF do not suit many users of imaging devices, particularly portable imaging device such as digital cameras.

Another approach to automatic focus involves depth from defocus. Conventional methods and devices employing depth from defocus are typically limited to stationary imaging devices. Further, these methods generally require modeling of blur information in order to determine automatic focus. As a result, parameters of the imaging device must be determined for each zoom and aperture state to allow for automatic focus. U.S. Ser. No. 12/857,343 cited above addresses these difficulties, and provides a process for estimating focus depth based on depth from defocus that correlates the amount of object blur and correct object distance. That application also provides a confidence level for the estimated depth.

Two other problems appear when using depth from defocus methods for the purpose of depth estimation. The first problem has to do with the inherent ambiguity of determining depth from defocus. Ambiguity results from the fact that the amount of blur for an object located in front of the focusing position and the amount of blur for the same object located behind the focusing position might be the same. Therefore, depth estimation which is based on a single defocus measurement is ambiguous. The second problem is the reliability problem due to the difficulty in accurately measuring the amount of blur for a given scene. It would be advantageous to provide a solution that overcomes these deficiencies.

SUMMARY OF THE INVENTION

Disclosed and claimed herein are a device, method, and computer program product for improving depth-from-defocus measurements for an imaging device. The method for example comprises receiving a sequence of input depth-from-defocus measurements each comprising at least one of a depth estimation, ambiguity indication, and confidence level, combining a current measurement with at least one previous measurement, determining if an improved estimate with reduced ambiguity and a confidence level exceeding a threshold can be calculated, and according to the determining, at least one of (a) calculating, storing, and outputting the improved estimate, (b) repeating the method with another available input measurement, and (c) ending the method. If an ambiguity indication is not provided for an input measurement, the input measurement may be assumed to be non-ambiguous. If a confidence level is not provided for an input measurement, the confidence level may be set to be equal for all input measurements. The input measurement may include at least one of a depth estimation, an ambiguity indication, and a confidence level, from a non-depth-from-defocus estimator. A user may determine when to end the operation. Embodiments of the invention may control an automatic focusing system with the improved estimate. Other embodiments may include a depth map estimation system of a 3D scene; for example, for the purpose of creating the left and right images of a 3D scene based on a single image and the depth map. The input measurement may be from at least one of an image and an image portion. The previous measurement may be from an immediately preceding iteration.

The calculating may comprise, if one of the current measurement and the previous measurement is ambiguous, selecting the non-ambiguous measurement as the improved estimate. The calculating may also comprise, if the current measurement and the previous measurement are both ambiguous, then find the two nearest depth estimations from the current measurement and the previous measurement, compare the two nearest depth estimations with a predefined threshold, and if the absolute difference between the two nearest depth estimations is less than the threshold then responsively set the improved estimate as the mean of the two nearest depth estimations and set the confidence level as the mean of the two corresponding confidence levels and set the improved estimate to be non-ambiguous, else use all the depth estimations for the improved estimate. The calculating may further comprise, if the current measurement and the previous measurement are both non-ambiguous, then compare the current depth measurement and the previous depth measurement with a predefined threshold, and if the absolute difference between the previous and current depth measurements is larger than a predefined threshold, then conclude that depth estimation is not possible and end the operation, else the combined estimate is the measurement with the highest confidence level.

Other aspects, features, and techniques of the invention will be apparent to one skilled in the relevant art in view of the following detailed description of the invention embodiments.

BRIEF DESCRIPTION OF THE DRAWINGS

The features, objects, and advantages of the present invention will become more apparent from the detailed description set forth below when taken in conjunction with the drawings in which like reference characters identify correspondingly throughout. The accompanying drawings are not intended to be drawn to scale. In the drawings, each identical or nearly identical component that is illustrated in various figures is represented by a like numeral. For purposes of clarity, not every component may be labeled in every drawing. In the drawings.

DESCRIPTION OF THE EMBODIMENTS

Figure 1:
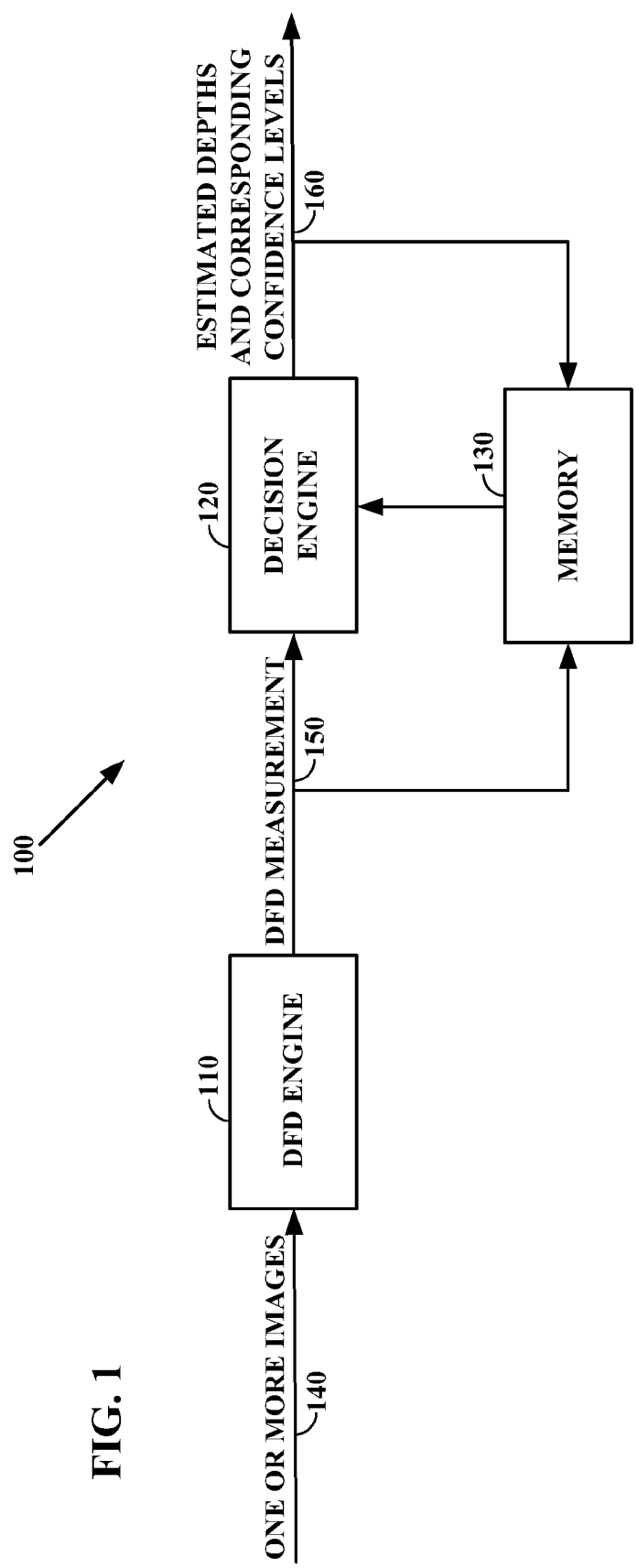
FIG. 1 is a diagram that depicts the basic operation of embodiments of the invention, based on DFD measurements and corresponding decisions.

The invention will now be described more fully hereinafter with reference to the accompanying drawings, which form a part thereof, and which show, by way of illustration, specific embodiments by which the invention may be practiced. The invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the invention may be embodied as methods or devices. Accordingly, the invention may take the form of an entirely hardware embodiment in the form of modules or circuits, and entirely software embodiment in the form of software executed on a general purpose microprocessor, an application specific microprocessor processor, a general purpose digital signal processor or an application specific digital signal processor, or an embodiment combining software and hardware aspects. Thus, in the following description, the terms "circuit" and "module" will be used interchangeably to indicate a processing element that executes an operation on an input signal and provides an output signal therefrom regardless of the hardware or software form of its implementation. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or", unless the context clearly dictates otherwise. Therefore, "A, B or C" means any of the following: A; B; C; A and B; A and C; B and C; A, B and C. An exception to this definition will occur only when a combination of elements, functions, steps or acts are in some way inherently mutually exclusive. The term "based on" is not exclusive and allows for being based on additional factors not described, unless the context clearly dictates otherwise. In addition, throughout the specification, the meaning of "a", "an", "and" and "the" include plural references. The term "another" is defined as a second or more. The meaning of "in" includes "in" and "on". Also, the use of "including", "comprising", "having", "containing", "involving", and variations thereof herein, is meant to encompass the items listed thereafter and equivalents thereof as well as additional items.

Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases in various places throughout this specification are not necessarily all referring to the same embodiment. Furthermore, the particular features, structures, or characteristics may be combined in any suitable manner on one or more embodiments without limitation.

In accordance with the practices of persons skilled in the art of computer programming, the invention is described below with reference to operations that can be performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the invention are essentially the code segments to perform the necessary tasks. The code segments can be stored in a "processor storage medium," which includes any medium that can store information. Examples of the processor storage medium include an electronic circuit, a semiconductor memory device, a ROM, a flash memory or other nonvolatile memory, a floppy diskette, a CD-ROM, an optical disk, a hard disk, etc.

Embodiments of the present invention provide a solution for progressively resolving the problems of ambiguity and reliability associated with depth from defocus schemes. The progressive approach of the embodiments considers several DFD results arriving one after the other, and combines them in order to solve the ambiguity problem and to get a reliable result. Each DFD measurement can have several possible estimated depths and each estimated depth might also have a confidence level which represents the estimated depth reliability. After the arrival of a new measurement, all the estimated depths and confidence levels in the scene are recalculated based on the previous measurements and the current measurement. Then, the system outputs the new estimated depths and confidence levels. Some of the estimated depths may be still ambiguous while some may become non-ambiguous. Additionally, some may still have a low confidence level while others may have improved reliability.

Hence, according to the principles of the invention, at each arrival of a new measurement the system updates the estimated depths, ambiguity indications and confidence levels. The system and/or the user may decide whether to stop the process of taking additional measurements based on the new results. The system and/or the user may further use these results in assisting in additional depth estimation processes which can be executed in parallel, e.g., a depth from focus process.

The embodiments enable new product features for users. In particular, the use of a DFD based auto focus scheme, either in assist or direct form, is enabled. Further, auto focusing with a single zoom sweep, i.e., without the need to go backward and forward with the focus motor, may be achieved. These options will accelerate the auto focusing process. Embodiments may also be useful in depth map estimation for the purpose of 3D reconstruction of a scene.

The embodiments describe a scheme for handling the results of a plurality of DFD measurements arriving sequentially. A particular example is an auto focus procedure that takes images of a scene with changing focus positions. Each image, or part thereof, i.e., some region of interest, is processed using a DFD method (e.g. that of prior application U.S. Ser. No. 12/857,343, although that is not a limiting example) and the resulting measurement is provided for processing in accordance with the principles of the invention.

In general, DFD methods may use one or several images for providing the estimated depths. The DFD measurement may include several estimated depths that mean that the depth estimation is identified as being ambiguous. In addition, the DFD measurement may also include a confidence level for each of the estimated depths that describe the reliability of the estimated depth.

Reference is now made to FIG. 1 that depicts the basic operation of the embodiments that are based on DFD measurements and corresponding decisions. A DFD engine 110 receives at each computation cycle one or more images 140 as an input. In each cycle the DFD engine 110 calculates a new DFD measurement 150. The new measurement 150 is fed into a decision engine 120 which estimates depths and corresponding confidence levels 160 for the current cycle. The decision process performed by decision engine 120 is based on the new DFD measurement and on at least one of the previous DFD measurements and estimated depths and corresponding confidence levels 160 stored in memory 130.

Figure 2:
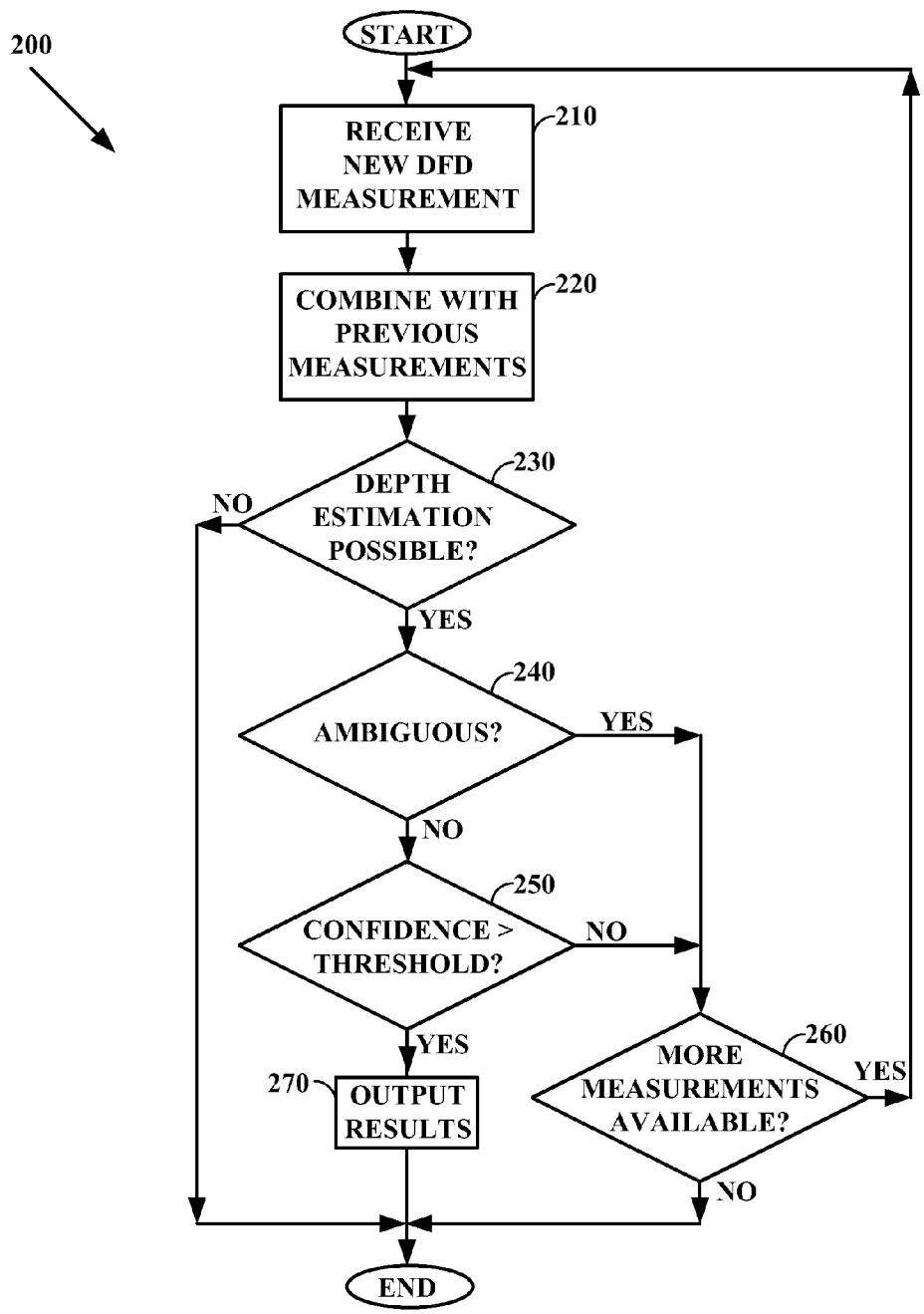
FIG. 2 is a flowchart of the decision process denoted in FIG. 1, according to embodiments of the present invention.

According to embodiments of the present invention, the decision process carried out by decision engine 120 of FIG. 1 has an exemplary and non-limiting operation that is described in the flowchart of process 200 of FIG. 2. In step 210 a new DFD measurement is received. This measurement may be for an image or a portion thereof. In step 220 the current result is appropriately combined with previous measurements.

There are several ways to combine a new measurement with previous measurements. For a non-limiting example it is assumed that the combination process remembers only the output of the last combination, referred to herein as the Old Measurement; the new one is referred to as the New Measurement. At start time, the last combination is initialized to be the first measurement. Then the flow of the combination process may be expressed by the following exemplary and non-limiting pseudo code:
1. If the New Measurement is non-ambiguous and the Old Measurement is ambiguous:
   a. Combined result=New Measurement
2. Else, if the New Measurement is ambiguous and the Old Measurement is non-ambiguous:
   a. Combined result=Old Measurement
3. Else, if the New Measurement is ambiguous and the Old Measurement is also ambiguous:
   a. Find the two nearest depth estimations from the Old Measurement and the New Measurement.
   b. If the absolute difference between these two depth estimations is less than a predefined threshold:
      i. Set the combined depth as the mean of these two depth estimations and set the confidence level as the mean of the two corresponding confidences where the combined depth estimation has no ambiguity.
   c. Else, use all the estimated depths as the combined measurement.
4. Else, if the New Measurement is non-ambiguous and the Old Measurement is also non-ambiguous:
   a. If the absolute difference between these two depth estimations is bigger than a predefined threshold and both confidences are higher than another predefined threshold (i.e. there are two conflicting high confidence measurements):
      i. Decide that depth estimation is not possible.
   b. Else
      i. Combined result=the measurement with the highest confidence.

It should be noted that other flows for the combination process are possible and are within the scope of the present invention. In particular, it is possible to use all the DFD measurements that were previously derived, or any portion thereof.

Returning now to FIG. 2, at step 230 it is determined whether depth estimation is not possible, and if not then the process ends, otherwise execution continues with step 240. At step 240 it is determined whether the result is ambiguous, as discussed above, and if so execution jumps to step 260; otherwise, execution continues with step 250. At step 250 the confidence of the result is compared with a predetermined threshold and, if the comparison is successful, execution is terminated and estimated depths and corresponding confidence level results that are deemed reliable are output in step 270; else execution continues with step 260. At step 260 the process selectively checks whether additional measurements are available for use, and if so execution returns to step 210 to try for improvement through another iteration; otherwise, execution terminates.

In one embodiment and its corresponding flowchart 200, if the DFD method does not provide a confidence level, then the confidence level may be set to be equal for all estimated depths. In another embodiment its corresponding flowchart 200, if the DFD method does not provide an ambiguity indication, then it is assumed that the depth estimation is non-ambiguous.

One alternate way to achieve similar results is to try and design the DFD method such that there will be no ambiguity. This might be possible when trying to find a depth within a small range of the possible focus range. Naturally, however, this limits the useful range of object distances that can be found by such a DFD scheme. Another option for solving the ambiguity problem is to add another cue from a different system, for example, a phase-based focusing system, that will solve the inherent ambiguity. Of course this requires the use of another system.

Yet another option for improving ambiguity estimation is to calculate a sharpness measure for the images used by the DFD engine. This information, in a way similar to DFF, can sometimes help in resolving the ambiguity problem by eliminating wrong depth estimate values. For example, if a sufficient number of sharpness measures exists such that one may find a region where the estimated depth should be, i.e. a region where the sharpness is higher than in other regions, then one may eliminate depth estimations that are not within this region.

For sophisticated cameras having, for example, multiple lenses or sophisticated lenses, the DFD measurements may all be available at the same time, rather than sequentially. However, for other situations, the present invention is believed to be a superior solution.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only. Trademarks and copyrights referred to herein are the property of their respective owners.

What is claimed is:

1. A method for improving depth-from-defocus measurements for an imaging device, comprising:
   receiving a sequence of input depth-from-defocus measurements, wherein each measurement comprising at least a depth estimation, an ambiguity indication, and a confidence level;
   combining a current measurement with at least one previous measurement based on at least the current measurement's ambiguity indication and the at least one previous measurement's ambiguity indication; and
   if an improved depth estimation, a reduced ambiguity indication, and a confidence level exceeding a threshold are calculated, responsively performing at least one of (a) calculating, storing, and outputting the improved depth estimation, (b) repeating the method with another available input measurement, and (c) ending the method.

2. The method of claim 1 wherein if an ambiguity indication is not provided for at least one input measurement, the at least one input measurement's ambiguity indication is set to non-ambiguous.

3. The method of claim 1 wherein if a confidence level is not provided for at least one input measurement, the confidence level is set to be equal for all input measurements.

4. The method of claim 1 wherein each input measurement includes at least a depth estimation, an ambiguity indication, and a confidence level, from a non-depth-from defocus estimator.

5. The method of claim 1, wherein a user determines when to end the method.

6. The method of claim 1 further comprising controlling an automatic focusing system with the improved depth estimation.

7. The method of claim 1 further comprising estimating a depth map with the improved depth estimation.

8. The method of claim 1 wherein at least one input measurement is from at least one of an image and an image portion.

9. The method of claim 1 wherein the previous measurement is from an immediately preceding iteration.

10. The method of claim 1 wherein calculating the improved depth estimation includes using a non-depth-from-defocus depth estimation based on a sharpness metric.

11. The method of claim 1 wherein the calculating comprises, if either the current measurement or the previous measurement is non-ambiguous, then the improved depth estimation corresponds with the non-ambiguous measurement.

12. The method of claim 1 wherein the calculating comprises, if the current measurement and the previous measurement are both ambiguous, then:
   find two nearest depth estimations from the current measurement and the previous measurement;
   compare the two nearest depth estimations with a predefined threshold, and if an absolute difference between the two nearest depth estimations is less than the predefined threshold then the improved depth estimation corresponds with a mean of the two nearest depth estimations, the confidence level exceeding the threshold corresponds with a mean of the two nearest depth estimations corresponding confidence levels, and set the reduced ambiguity indication to non-ambiguous, else use all the input measurements' depth estimations to determine the improved depth estimation.

13. The method of claim wherein the calculating further comprises, if the current measurement and the previous measurement are both non-ambiguous, then:
   compare the current depth measurement and the previous depth measurement with a predefined threshold, and if an absolute difference between the previous and current depth measurements is larger than the predefined threshold and each confidence level of the current and previous depth measurements are larger than another threshold, then end the method, else the improved depth estimation corresponds with that measurement having a highest confidence level.

14. A system for improving depth-from-defocus measurements for an imaging device, comprising a decision engine that performs a system operation that:
   receives a sequence of input depth-from-defocus measurements, wherein each measurement comprising at least a depth estimation, an ambiguity indication, and a confidence level;
   combines a current measurement with at least one previous measurement based on at least the current measurement's ambiguity indication and the at least one previous measurement's ambiguity indication; and
   if an improved depth estimation, a reduced ambiguity indication, and a confidence level exceeding a threshold are calculated, responsively performing at least one of (a) calculates, stores, and outputs the improved depth estimation, (b) repeats the system operation with another available input measurement, and (c) ends the system operation.

15. The system of claim 14 wherein if an ambiguity indication is not provided for at least one input measurement the at least one input measurement's ambiguity indication is set to non-ambiguous.

16. The system of claim 14 wherein if a confidence level is not provided for at least one input measurement, the confidence level is set to be equal for all input measurements.

17. The system of claim 14 wherein each input measurement includes at least a depth estimation, an ambiguity indication, and a confidence level, from a non-depth-from defocus estimator.

18. The system of claim 14, wherein a user determines when to end the system operation.

19. The system of claim 14 further comprising controlling an automatic focusing system with the improved depth estimation.

20. The system of claim 14 further comprising estimating a depth map with the improved depth estimation.

21. The system of claim 14 wherein at least one input measurement is from at least one of an image and an image portion.

22. The system of claim 14 wherein the previous measurement is from an immediately preceding iteration.

23. The system of claim 14 wherein calculating the improved depth estimation includes using a non-depth-from-defocus depth estimation based on a sharpness metric.

24. The system of claim 14 wherein the calculating comprises, if either the current measurement or the previous measurement is non-ambiguous, then the improved depth estimation corresponds with the non-ambiguous measurement.

25. The system of claim 14 wherein the calculating further comprises, if the current measurement and the previous measurement are both ambiguous, then:
   find two nearest depth estimations from the current measurement and the previous measurement;
   compare the two nearest depth estimations with a predefined threshold, and if an absolute difference between the two nearest depth estimations is less than the predefined threshold then the improved depth estimation corresponds with a mean of the two nearest depth estimations, the confidence level exceeding the threshold corresponds with a mean of the two nearest depth estimations corresponding confidence levels, and set the reduced ambiguity indication to non-ambiguous, else use all the input measurements' depth estimations to determine the improved depth estimation.

26. The system of claim 14 wherein the calculating further comprises, if the current measurement and the previous measurement are both non-ambiguous, then:

compare the current depth measurement and the previous depth measurement with a predefined threshold, and if an absolute difference between the previous and current depth measurements is larger than the predefined threshold and each confidence level of the current and previous depth measurements are larger than another threshold, then end the system operation, else the improved depth estimation corresponds with that measurement having a highest confidence level.

27. A computer program product comprising a machine-readable medium tangibly embodying non-transitory program instructions thereon that, an execution by a computer, causes the computer to:

receive a sequence of input depth-from-defocus measurements, wherein each measurement comprising at least a depth estimation, an ambiguity indication, and a confidence level;

combine a current measurement with at least one previous measurement based on at least the current measurement's ambiguity indication and the at least one previous measurement's ambiguity indication; and if an improved depth estimation, a reduced ambiguity indication, and a confidence level exceeding a threshold are calculated, responsively performing at least one of (a) calculate, store, and output the improved depth estimation, (b) repeat the execution with another available input measurement, and (c) end the execution.

28. A system comprising means for a system operation comprising:

receiving a sequence of input depth-from-defocus measurements, wherein each measurement comprising at least a depth estimation, an ambiguity indication, and a confidence level;

combining a current measurement with at least one previous measurement based on at least the current measurement's ambiguity indication and the at least one previous measurement's ambiguity indication; and if an improved depth estimation, a reduced ambiguity indication, and a confidence level exceeding a threshold are calculated, responsively performing at least one of (a) calculating, storing, and outputting the improved depth estimation, (b) repeating the system operation with another available input measurement, and (c) ending the system operation.

* * * * *